United States Patent
Fritchman

(10) Patent No.: US 6,785,677 B1
(45) Date of Patent: Aug. 31, 2004

(54) METHOD FOR EXECUTION OF QUERY TO SEARCH STRINGS OF CHARACTERS THAT MATCH PATTERN WITH A TARGET STRING UTILIZING BIT VECTOR

(75) Inventor: Barry Lynn Fritchman, Lake Forest, CA (US)

(73) Assignee: Unisys Corporation, Blue Bell, PA (US)

( * ) Notice: Subject to any disclaimer, the term of this patent is extended or adjusted under 35 U.S.C. 154(b) by 414 days.

(21) Appl. No.: 09/847,473

(22) Filed: May 2, 2001

(51) Int. Cl.[7] ............................................. G06F 17/30
(52) U.S. Cl. .................. 707/6; 707/3; 707/5; 707/7
(58) Field of Search .................. 707/1–10, 104–104.1, 707/200–205; 709/230–238; 704/1–10, 39; 710/49–51, 65, 267–269; 358/403; 382/173, 177, 231, 309, 310, 229, 218; 340/146.2; 712/300; 714/39, 715, 735

(56) References Cited

U.S. PATENT DOCUMENTS

| | | | | |
|---|---|---|---|---|
| 4,450,520 A | * | 5/1984 | Hollaar et al. ................ | 710/65 |
| 5,051,745 A | * | 9/1991 | Katz ............................ | 341/51 |
| 5,412,808 A | * | 5/1995 | Bauer ........................... | 707/1 |
| 5,559,693 A | * | 9/1996 | Anick et al. ................... | 704/9 |
| 5,615,283 A | * | 3/1997 | Donchin ..................... | 382/187 |
| 5,794,177 A | * | 8/1998 | Carus et al. ................... | 704/9 |
| 5,926,652 A | * | 7/1999 | Reznak ....................... | 712/300 |
| 6,018,735 A | * | 1/2000 | Hunter ......................... | 707/5 |
| 6,026,398 A | * | 2/2000 | Brown et al. .................. | 707/5 |
| 6,047,283 A | | 4/2000 | Braun | |
| 6,122,757 A | * | 9/2000 | Kelley ......................... | 714/39 |
| 6,131,092 A | * | 10/2000 | Masand ........................ | 707/6 |
| 6,321,224 B1 | * | 11/2001 | Beall et al. .................... | 707/5 |
| 6,338,061 B1 | * | 1/2002 | Shimomura ................... | 707/6 |
| 6,397,346 B1 | * | 5/2002 | Cavanaugh et al. .......... | 714/4 |
| 6,459,810 B1 | * | 10/2002 | Cring .......................... | 382/229 |
| 2003/0200528 A1 | * | 10/2003 | Li ............................... | 717/110 |

FOREIGN PATENT DOCUMENTS

WO  WO 92/15067  * 9/1992 ................ 15/415

OTHER PUBLICATIONS

Jack S.N et al., Query processing with a FPGA coprocessor Board, pp 1–7.*

Daniel Lopresti et al., Cross domain approximate string matching, 6th internatinal symposium on string processing and information retrieval, Sep. 1999, pp 1–8.*

* cited by examiner

*Primary Examiner*—Srirama Channavajjala
(74) *Attorney, Agent, or Firm*—Alfred W. Kozak; Mark T. Starr; Lise A. Rode

(57) ABSTRACT

The method of the present invention is useful in a computer system including at least one client. The program executes a method for matching a pattern string with a target string, where either string can contain single or multi-character wild cards. The method includes the steps of preprocessing the pattern string into a prefix segment, a suffix segment, and zero or more interior segments. Next, matching the prefix segment, the suffix segment, and the interior segment(s) with the target string.

10 Claims, 8 Drawing Sheets

PREPROCESS PREFIX

PREPROCESS SUFFIX

PREPROCESS INTERIOR SEGMENTS

MATCH SUFFIX

MATCH PREFIX

MATCH INTERIOR SEGMENTS

METHOD FOR EXECUTION OF QUERY TO SEARCH STRINGS OF CHARACTERS THAT MATCH PATTERN WITH A TARGET STRING UTILIZING BIT VECTOR

FIELD OF THE INVENTION

The present invention generally relates to the field of Structured Query Language (SQL) and in particular to a method for significantly improving the performance of executing pattern matching queries in which the special characters used in the pattern are limited to single and multi-character wild cards, rather than full regular expressions.

BACKGROUND OF THE INVENTION

Structured Query Language (SQL) is a widely used language for accessing data stored in relational databases. To allow the selective retrieval of data, SQL provides predicates that can be applied to data to determine which records are retrieved. For example, the following SQL query uses a comparison predicate to select those employee records for any employee whose last name is "Smith":

Select*From employee Where last_name='Smith'

One particularly powerful predicate found in all SQL implementations is the LIKE predicate, which determines whether string-valued fields in the database conform to a particular pattern:

Select*From employee Where last_name Like '% son'

The pattern, represented in the above query by '% son' describes a set consisting of all strings ending in "son". The multi-character wild card "%" matches any sequence of characters, including the empty string. An underscore "_") can be used to match a single arbitrary character. Aside from these two "wild card" metacharacters, characters occurring in the pattern are matched only by the same character in the string being tested against the pattern.

The pattern language defined by the LIKE predicate is a subset of a notation known as regular expressions. In addition to single- and multi-character wild card matching, regular expressions may contain syntax specifying grouping, choice, and repetition of subpatterns. Regular expressions are commonly used in performing the lexical analysis phase of compilation of computer program source code, breaking the input stream into distinct entities called tokens that are input to a parser for the language.

The most efficient solutions to this problem employ finite automata to represent the patterns for the token types used in the language. There are two different types of automata that may be used to represent regular expressions. A deterministic finite automaton (DFA) has the defining property that for any given input symbol in any given state, there is at most one transition to a new state that can be made. In a nondeterministic finite automaton (NFA), it is possible that there are two or more possible transitions from a given state for a given input symbol. Simulation of NFAs is difficult due to the potential ambiguity of nondeterministic state transitions, so DFAs are generally used as recognizers for regular expressions. As each symbol is read, a state transition is made based on the input symbol and the current state. The most efficient transition function involves a simple table lookup, where the table contains the transition state for each symbol/state pair. This requires a significant amount of memory for single-octet character sets such as ASCII, and a prohibitive amount for multi-octet character sets such as Unicode. Sparse matrix techniques can be employed to reduce the storage requirements of the transition table, but this results in reduced efficiency for the transition function.

The restrictive nature of the pattern language used with SQL's LIKE predicate makes it possible to derive a simpler, more efficient algorithm that does not require construction of automata and tracking of state changes for each character processed during evaluation of the predicate. While suitable for evaluation of fully general patterns based on unrestricted regular expressions, automata-based algorithms are overkill for the LIKE predicate. The present invention achieves significantly accelerated performance for evaluation of patterns such as those permitted by the LIKE predicate, which utilize only wild card operators (single-character and multi-character).

One prior art method to which the method of the present invention generally relates is described in U.S. Pat. No. 5,926,652 entitled MATCHING OF WILD CARD PATTERNS TO WILD CARD STRINGS ASSOCIATED WITH NAMED COMPUTER OBJECTS. The prior art method of matching computer wild card patterns involves comparing first and second character strings associated with named objects residing on a computer system to determine whether the first character string defines a first group of computer objects which is a logical subset of a second group of computer objects defined by the second character string. The first character string is provided by a user; such as in a command line, and the second character string is pre-defined, such as by a network administrator. The method can be performed by examining whether the second character string has any wild card character which can substitute for one and only one character, or by examining whether the second character string has any wild card character which can substitute for any number of characters, including no characters (a universal character). The second character string can further be examined to see if it contains any embedded sequence of characters having no universal wild card character.

The present invention differs from the prior art in that the prior art method is concerned with matching a pair of patterns to determine whether one is a logical subset of the other. The method of the present invention seeks instead to determine whether a text string (which is a literal value rather than another pattern) is a member of the set of strings derivable from the pattern. That is, it determines whether the string matches the pattern. Unlike the prior art method, the present invention decomposes the pattern into segments of literal text bounded by multi-character wild cards, and employs a string-matching algorithm modified to take single-character wild cards into account to search for the substrings within the target string.

Another prior art method to which the method of the present invention generally relates is detailed in U.S. Pat. No. 6,047,283 entitled FAST STRING SEARCHING AND INDEXING USING A SEARCH TREE HAVING A PLURALITY OF LINKED NODES. This prior art is a fast string indexing method that efficiently stores, searches, and removes alphanumeric or binary strings utilizing a compacted search tree. The number of levels in the search tree is minimized by having a node represent more than one character when possible. Each inner node of the tree contains a hash table array for successive hashing, which also minimizes the time required to traverse a given node. Searches may be performed for partial matches, such as wild cards at the character level. Multiple indices may be opened independently and concurrently on the same table of string entries.

The present invention differs from the prior art in that the prior art method is used as an access method on a database, and is comprised of a search tree that indexes strings so those strings may be looked up quickly in a database search. The intent is to overcome limitations of other access methods such as linear searching, hashing, and conventional search trees. Strings searched for in the search tree described in the prior art method can contain single-character wild cards, but not wild cards that match substrings of arbitrary length as in the present invention. The prior art method finds matching strings by traversing a tree structure containing representations of the strings being searched, while the current invention instead matches strings against a pattern without requiring those strings to be indexed. Another difference is that the present invention uses a string-matching algorithm to match literal substrings between wild cards, whereas the prior art method searches by traversing the nodes of its search tree.

It is therefore an object of the present invention to improve the performance of matching string patterns containing wild card characters.

Still another object of the present invention is to increase the efficiency of database transactions involving SQL queries that use the LIKE predicate for pattern matching.

Still another object of the present invention is to plug in a high-performance string search algorithm of choice in a wild card pattern matching task.

Other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

SUMMARY OF THE INVENTION

The method of the present invention is useful in a computer system including at least one client. The program executes a method for matching a pattern string with a target string, where the pattern string can contain single- or multi-character wild cards. The method includes the steps of preprocessing the pattern string into a prefix segment, a suffix segment, and zero or more interior segments. Next, matching the prefix segment, the suffix segment, and the interior segment(s) with the target string.

The present method enables a Client-User to initiate a Structured Query Language (SQL) query to search for strings of characters which match a pre-designated pattern having zero or more wild card characters. By having a network protocol via a file server, then a database can be accessed to retrieve information on matching characters. The method determines whether a text string is a member of a set of strings derivable from the pattern. A string-matching algorithm operates to match literal substrings between wild cards.

GLOSSARY OF RELEVANT TERMS

Figure 1:
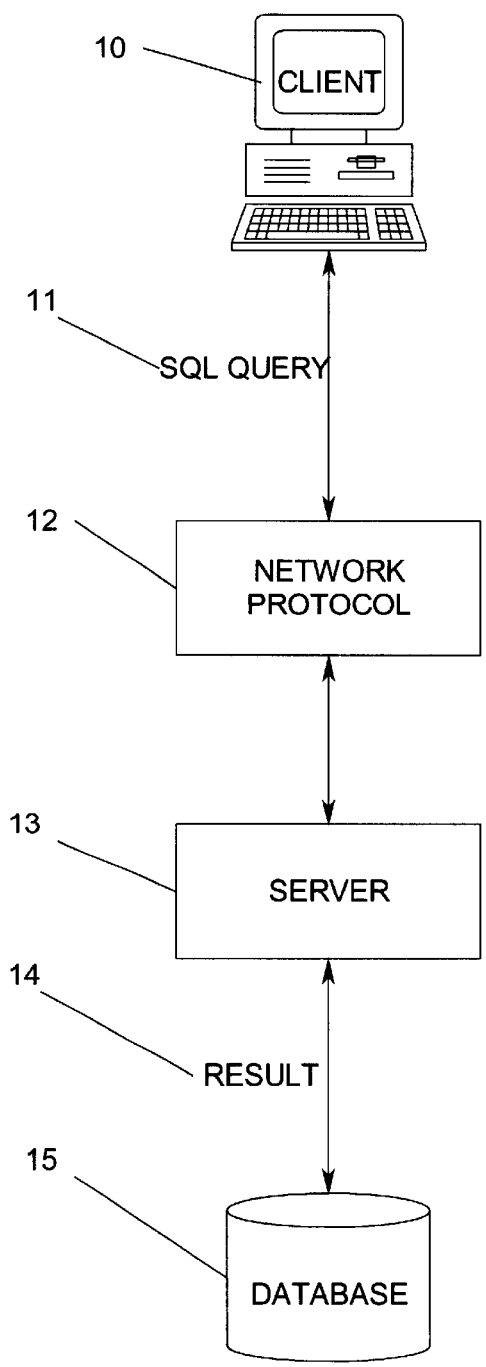
FIG. 1 is a generalized block diagram of a system that may use the method of the present invention.

1. BIT VECTOR: An array containing bits representing each character in the string. In the present invention, a bit is enabled for every single-character wildcard. For example, where the Pattern D_G is involved, the bit vector "1" is set to characterize the single character wild card.

Pattern: D _ G

Bit Vector: | 0 | 1 | 0 |

2. BIT VECTOR VARIABLE: An instance of a bit vector.
3. BOYER-MOORE SEARCH: A string matching algorithm which compares characters from the end of the search string to its beginning. When characters don't match, searching jumps to the next possible match.
4. CHARACTER POSITION OF C: The index of character variable C within S, the interior segment portion of the pattern string. The character position of C is used to mark the indices within S containing single-character wildcards. These indices are enabled at their respective positions within the bit vector.
5. CHARACTER VARIABLE C: A variable of type character used in building up the interior segment(s) of the pattern string.
6. DELIMIT: This involves setting the limits of some entity, generally by using a special symbol called a delimiter. Programming languages typically delimit such variable-length elements as comments, strings, and program blocks.
7. DELIMITER: This is a special character that sets off, or separates, individual items in a program or set of data. For example, commas might be used to separate the fields in a record.
8. DETERMINISTIC FINITE AUTOMATON (DFA): An FSM (Finite State Machine) where the next state is uniquely determined by a single input event.
9. EMPTY LIST: A list containing no elements. The list that represents the interior segments of the pattern string is initially empty.
10. EMPTY LIST OF STRINGS: A list of strings containing no elements.
11. EMPTY STRING: A string containing no characters.
12. ESC CHARACTER: A character which, when preceding a metacharacter in a pattern string, causes that metacharacter to be treated as a literal character.
13. ESCAPED CHARACTER: A character which follows an escape character and is thus treated as a literal character.
14. FINITE STATE MACHINE (FSM): An abstract machine consisting of a set of states (including the initial state), a set of input events, a set of output events and a state transition function. The function takes the current state and an input event and returns the new set of output events and the next state. Some states may be designated as "terminal states".

15. INTEGER VARIABLE N: A number used for incrementing purposes.
16. K: This is the variable for iterating through the prefix of the pattern string.
17. LEXICAL ANALYSIS PHASE (OF COMPUTER PROGRAM SOURCE CODE): The first phase of processing a language. The stream of characters making up the source program is read one at a time and grouped into lexemes (or tokens)—word-like pieces such as keywords, identifiers, literals and punctuation. The lexemes are then passed to the parser.
18. LIKE PREDICATE: A predicate that determines whether string-valued fields conform to a particular string pattern.
19. LIST L: This indicates the interior segments of the pattern string.
20. LITERAL WILD CARD: a keyboard character having the same value as a wild card character (i.e. "%" or "_"), but to be interpreted literally rather than as a wild card character by virtue of being preceded by the designated escape character.
21. M: This represents the length, or number of characters, of the prefix of the pattern string.
22. METACHARACTER: A character embedded in a program source or a data stream that conveys information about other characters, rather than itself representing a character. A simple example is the (\) character, which when used in strings in the C programming language, indicates that the letter following the backslash is part of an escape sequence that enables C to display a non-graphic character.
23. MULTI-CHARACTER WILD CARD: See multiple wild card character.
24. MULTIPLE WILD CARD CHARACTER: The wildcard character representing zero or more characters.
25. N: This represents the length of the suffix of the pattern string.
26. NON-DETERMINISTIC FINITE AUTOMATION (NFA): An FSM where the next state is determined not only on the current input event, but also on an arbitrary number of subsequent input events. Until these subsequent events occur it is not possible to determine which state the machine is in.
27. OPERAND: The object of a mathematical operation or a computer instruction.
28. PARSER: A unit that will break an input into smaller chunks so that a program can act upon the information.
29. PATTERN STRING: The text string containing a combination of literal and wild card characters that all target strings are compared to.
30. POSITION J: The index of the current character being examined within the suffix of the pattern string.
31. POSITION K OF THE TARGET STRING: An integer variable used for iterating through the prefix segment of the pattern string.
32. PREDICATE: An expression yielding a boolean value.
33. REGULAR EXPRESSIONS: The notation used to denote sets of strings using wild card characters and syntax specifying grouping, choice, and repetition of sub-patterns.
34. REPETITION OF SUB-PATTERN: A regular expression allowing for the repetition of a sub-string within a string. A set of parentheses "( )" can be used to denote the sub-string. For example, (01)* allows for the repetition of the sub-string "01" within a particular string.
35. S: A string consisting of the portion of the pattern string lying between the prefix and suffix segments. S, if not empty, is partitioned into one or more interior segments delimited by occurrences of the multi-character wild card.
36. SINGLE-CHARACTER WILD CARD: The wildcard character representing a single character.
37. SQL (STRUCTURED QUERY LANGUAGE): A database sub-language used in querying, updating, and managing relational databases. It is the de facto standard for querying relational databases.
38. STRING: A data structure composed of a sequence of characters usually representing human-readable text.
39. STRING VALUED FIELDS: A field within a database record that contains a string value.
40. STRING VARIABLE: An arbitrary name assigned by the programmer to a string of alpha-numeric characters and used to reference that entire string.
41. SUBSTRING: A contiguous sequence of characters from within a particular string.
42. TARGET STRING: A text string containing literal characters to be matched against the pattern string.
43. TOKEN: Any non-reducible textual element in data that is being parsed—for example, the use in a program of a variable name, a reserved word, or an operator. Storing Tokens as short codes shortens program files and speeds execution.
44. VARIABLE I: A variable used to iterate through the interior segment portion of the pattern string (by incrementation).
45. VARIABLE J: A variable used to iterate through the suffix of the pattern string.
46. VARIABLE L: The list containing the interior segments of the pattern string following preprocessing.
47. VECTOR: In data structures, this is a one-dimensional array—a set of items arranged in a single column or row.
48. WILD CARD CHARACTER: An element of a regular expression consisting of a keyboard character that can be used to represent zero or more characters. The symbol "%" for example, typically represents zero or more characters and the underline "_" typically represents a single character.

DETAILED DESCRIPTION OF PREFERRED EMBODIMENT

A typical example of the subject matter of this invention which involves a message for efficient and fast execution of queries for pattern matching is illustrated below. Often in computer operations, a search is instituted in order to find a string of characters in memory or in some database which will match a designated pattern of characters.

Table I is an illustrative example of the type of situation that is often faced. For example, the word "dog" may be resident in a particular memory or database. However, the person who is making the query has a particular pattern with certain unknown elements, such as "d_g". The underline represents the "single character" wild card which is presently unknown as to what may be available in the memory or database.

Then, at line 1 in searching for a match, it will be seen the target "dog" will provide a match which is shown in the third column as a "YES".

In the pattern situation of d % g at line 2, again, a pattern matching search would occur and the word "dog" would be a match and is designated as "YES".

In the third situation at line 3, where the pattern is d_g and the target word is "drag", there would not be a matching pattern, i.e., "NO", since the word "drag" has two characters, and not just one.

At line 4 where there is a pattern of d % g, then the target word DRAG would be a matching pattern "YES", since the "%" symbol represents a multi-character wild card and the two characters "ra" are more than one character.

At line 5 where the pattern is d_g and the target string is dg, there would not be a match with the result of "NO".

At line 6 where the pattern is d % g and the target is "dg", then this would be considered as a pattern match "YES", since the "%" matches zero or more arbitary characters, and in the case of line 6, the "%" matches the zero-length string of characters lying between "d" and "g".

| | PATTERN | TARGET | MATCH? |
|---|---|---|---|
| 1 | d_g | dog | YES |
| 2 | d%g | dog | YES |
| 3 | d_g | drag | NO |
| 4 | d%g | drag | YES |
| 5 | d_g | dg | NO |
| 6 | d%g | dg | YES |

"_" = single character wild card

"%" = multi-character wild card

Before proceeding with a detailed description of the method of the present invention a background disussion of the phases discussed in the method of the present invention may be helpful. When a query containing a LIKE predicate is processed, the pattern (the operand following the LIKE keyword) is preprocessed to derive the information necessary to evaluate strings against it for a possible match. This phase will be referred to as the preprocessing phase. During this phase, which occurs only once for the execution of a particular query, the pattern is partitioned into segments that are delimited by occurrences of the multi-character wild card. The LIKE predicate uses '%' for this purpose, and this character will be used in subsequent examples. If '%' is not the first character in the pattern, then the sequence of characters up to but not including the first '%' is the prefix segment. If there is no '%' in the pattern string, the entire pattern string is considered to be the prefix. If there is at least one '%' in the pattern, and a '%' is not the last character in the pattern, the sequence of characters from the one following the last '%' to the end of the pattern is the suffix segment. Segments consisting of characters between two occurrences of '%' are interior segments. Single-character wild cards, denoted by an underscore ('_'), do not demarcate segments; if they occur in a pattern, they are included in the segments demarcated by '%'. If there are any substrings within the pattern consisting of two or more adjacent occurrences of '%', all but one are removed from the pattern, as their use is redundant.

The LIKE predicate includes syntax to specify a character to be used as an "escape character", which becomes a metacharacter for the pattern contained in that predicate. The escape character must only precede another metacharacter (including itself), and indicates that the occurrence of the metacharacter it precedes is to be treated as an ordinary character for matching purposes. For example, when "$" is used as the escape character, the string "abc_% $xyz" matches the pattern "%$_$ % $$ %". A '%' preceded by the escape character does not delimit a segment, since it is not treated as a metacharacter. After the preprocessing phase, escape characters are removed from the pattern string, having fulfilled their purpose of preventing use of the escaped characters as metacharacters.

Each segment is characterized by its position within the pattern and its length. Interior segments are further characterized by the ordinal position of the segment. Position and length values reflect the state of the pattern string after removal of redundant duplicate '%' characters and escape characters. As each segment is isolated, a bit vector noting the position of any single-character wild cards within the segment is built. This is necessary in order to be able to distinguish a literal (escaped) wild card from one that serves as a metacharacter—remember that at this point, escape characters have been removed from the pattern string, and the only distinction between a literal underscore and one which is used as a wild card is the value in the bit vector for that character position.

In the second phase of execution, referred to as the matching phase, the pattern is applied to each database value in turn, where the value is the result of evaluating the first operand of the LIKE predicate for each candidate row retrieved from the database. Reference will be made to the value of the first operand as the target string. The target string is characterized by a starting position and length. This position and length are modified during the steps of the pattern matching operation, but the text of the string itself is never moved or copied; the changes in position and length merely identify the portion of the target string that has yet to be matched. Matching of a value against the pattern proceeds in the manner described below.

If the pattern contains a suffix segment, a character-for-character comparison is performed between the n characters constituting the suffix segment and the final n characters of the target string, where n is the length of the suffix. If the length of the target string is less than n, the match is considered a failure and the predicate immediately returns false. If any pair of characters in corresponding positions is not equal, and the wild card bit vector does not indicate that the character in that position is a single-character wild card, the match is considered a failure and the predicate immediately returns false. If the suffix matches the last n characters of the target string, the length of the target string is effectively reduced by n for further processing.

If the pattern contains a prefix segment, a character-for-character comparison is performed between the n characters constituting the prefix segment and the initial n characters of the target string, where n is the length of the prefix. If the length of the target string is less than n, the match is considered a failure and the predicate immediately returns false. If any pair of characters in corresponding positions is not equal, and the wild card bit vector does not indicate that the character in that position is a single-character wild card, the match is considered a failure and the predicate immediately returns false. If the prefix matches the first n characters of the target string, the length of the target string is effectively reduced by n and the starting position of the target string increased by n.

At this point the initial interior segment is matched against the front of the remaining text of the target string. By the criteria set up for interior segments, it is known that the text comprising the segment is bounded by multi-character wild cards. This being the case, the match can be tested by doing a string search for the segment text within the target string. This is a well-known problem to which there are a number of highly efficient solutions. The present algorithm allows any string-matching algorithm to be attached to the object describing the segment. The only requirement is that the string-matching algorithm be modified to take single-character wild cards into account, which are represented by a bit vector associated with the segment. A character at a position marked as containing a wild card is not required to match a character in the target string. The segment's string-matching algorithm is applied to the target string, locating the first occurrence of the segment text in the target string. If no match is found, the target string does not match the pattern and false is returned. If the segment text is located in the target string, the portion of the target string up to and including the matched text is effectively discarded by advancing the target string's start position to the first character after the matched text. The next segment is then applied to the remainder of the target string in the same manner. This process continues until all segments have been found in the target string. There may be additional text in the target string after the portion matched by the last segment, but any such text is matched by the final multi-character wild card that follows the last segment (recall that the suffix has at this point been matched and removed).

Referring now to the drawings and FIG. 1 in particular, a block diagram is shown of a system in which the method of the present invention may be used. The client 10 and a server 13 are coupled by means of a network protocol 12, as for example, like TCP/IP. The server 13 is in turn connected to a database 15. In the illustrated embodiment shown in FIG. 1, client 10 is capable of sending an SQL Query 11 for processing on the server 13. The server 13 references the database 15 to provide an answer to the SQL Query 11. Once the database 15 obtains a result 14 for the SQL Query 11, the database sends the result 14 to the server 13. The result 14 is then returned to the client 10.

Figure 2:
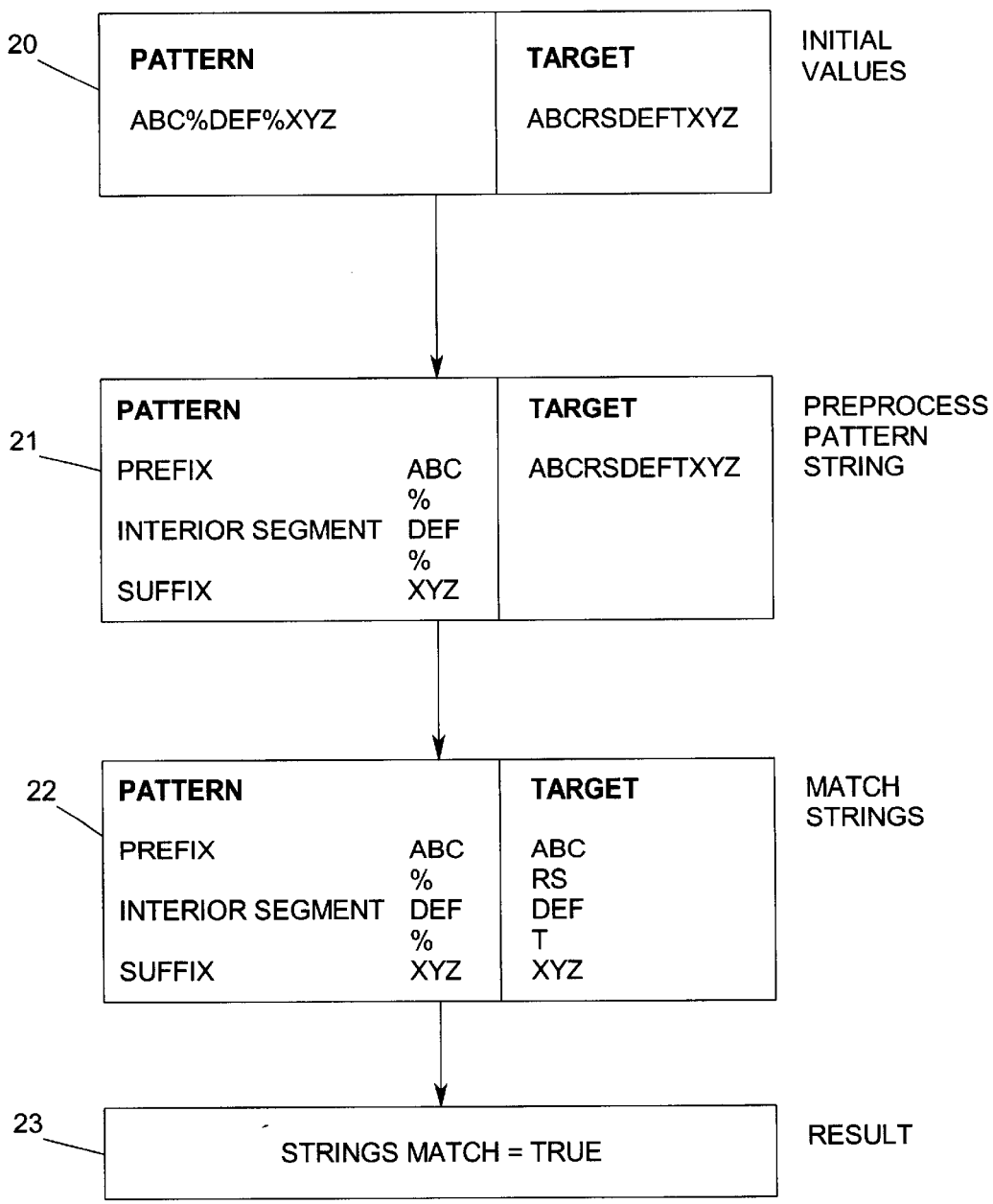
FIG. 2 is a table with examples of patterns and their respective prefix, suffix, and interior segments.

With reference to FIG. 2, a diagram illustrating the high-level process of matching a pattern string and a target string using the method of the present invention is shown. The process starts with the initial values of the pattern string and target string (block 20). The process continues by preprocessing the pattern string, thus determining prefix, suffix, and interior segment values (block 21). The process then matches the preprocessed pattern string with corresponding values from the target string (block 22). If the pattern string and target string match, the process returns true (block 23).

Figure 3A:
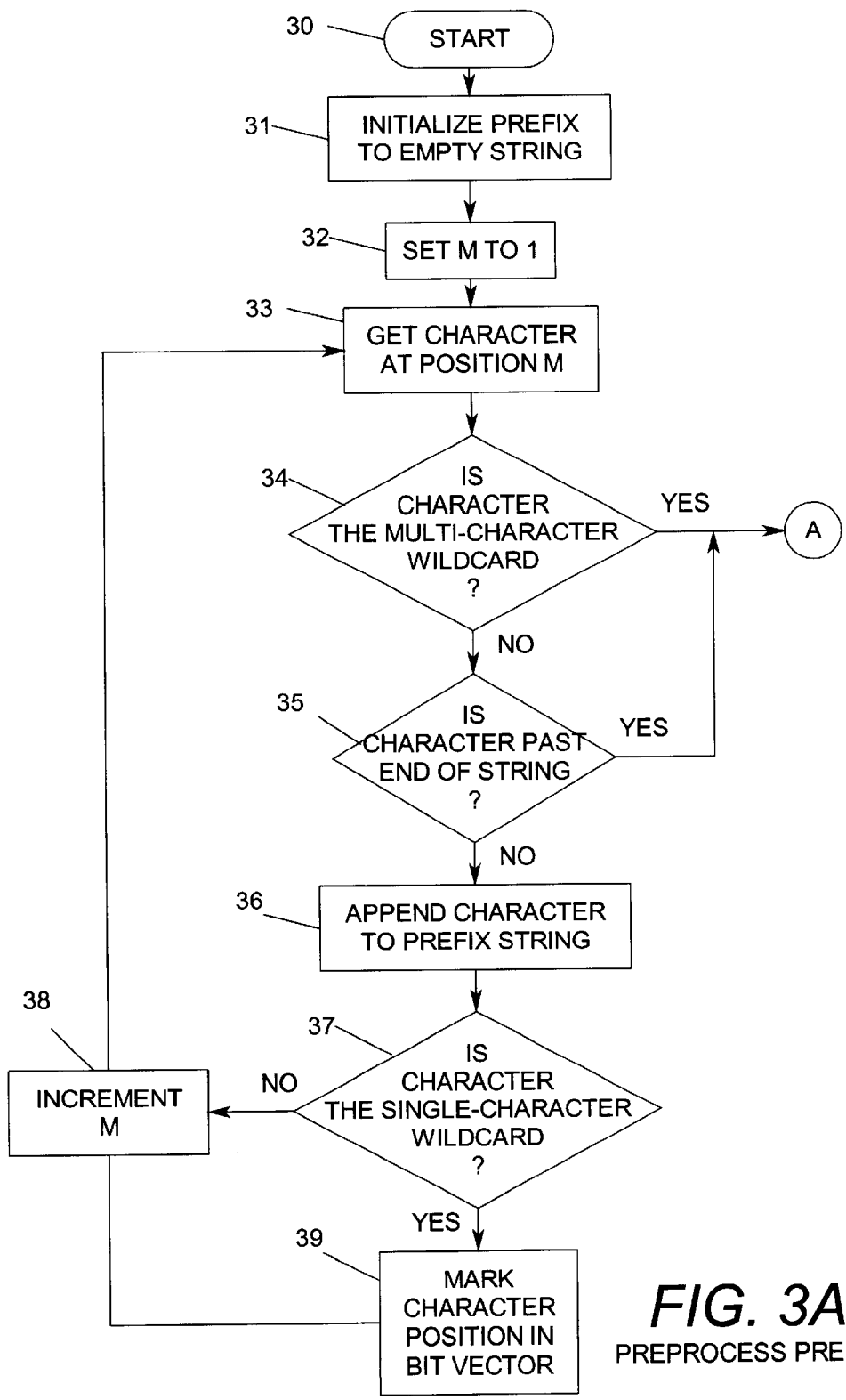
FIGS. 3A, 3B, and 3C combined form a flowchart that illustrates the steps for preprocessing a pattern in order to determine the prefix, suffix, and interior segments.
Figure 3B:
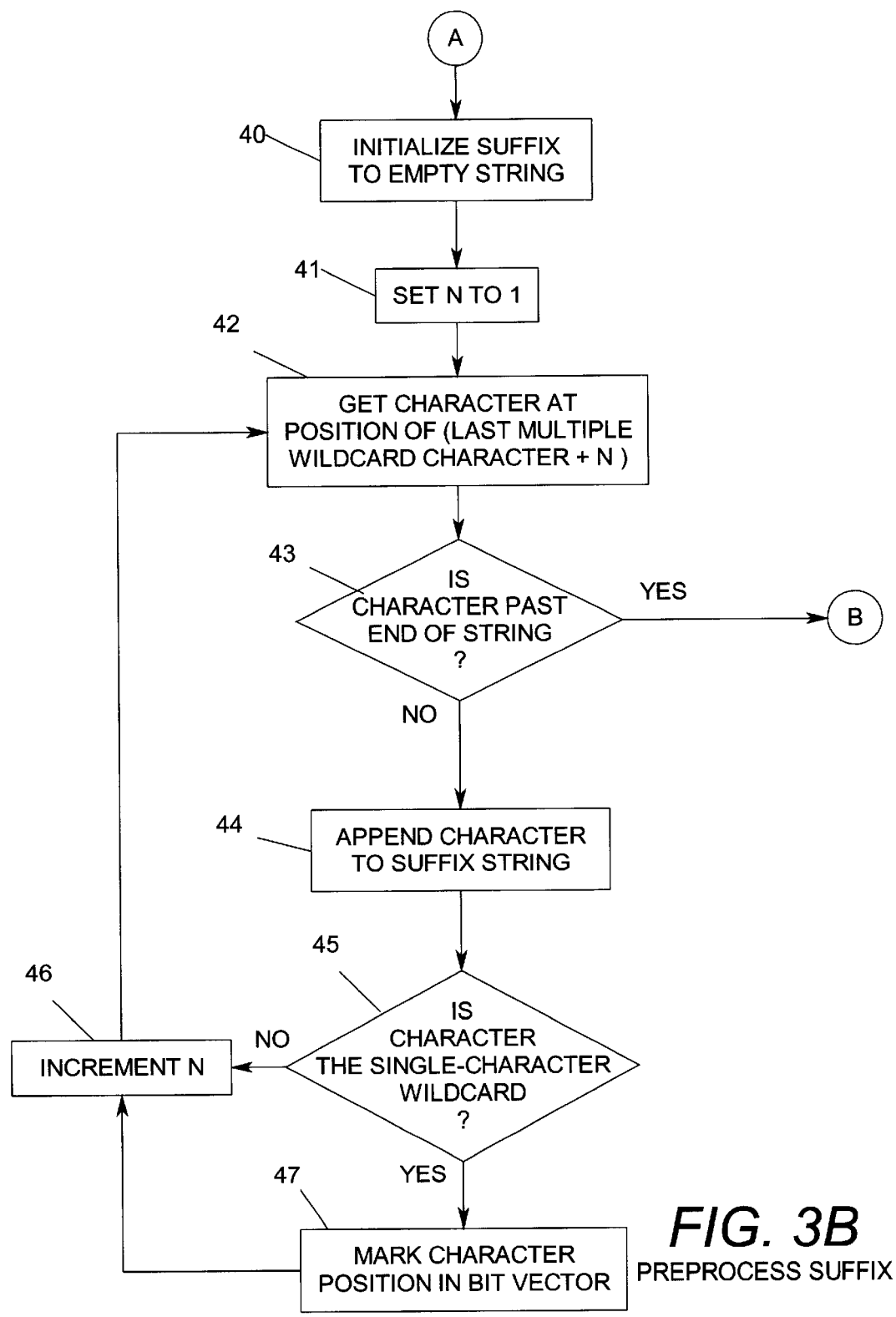
Figure 3C:
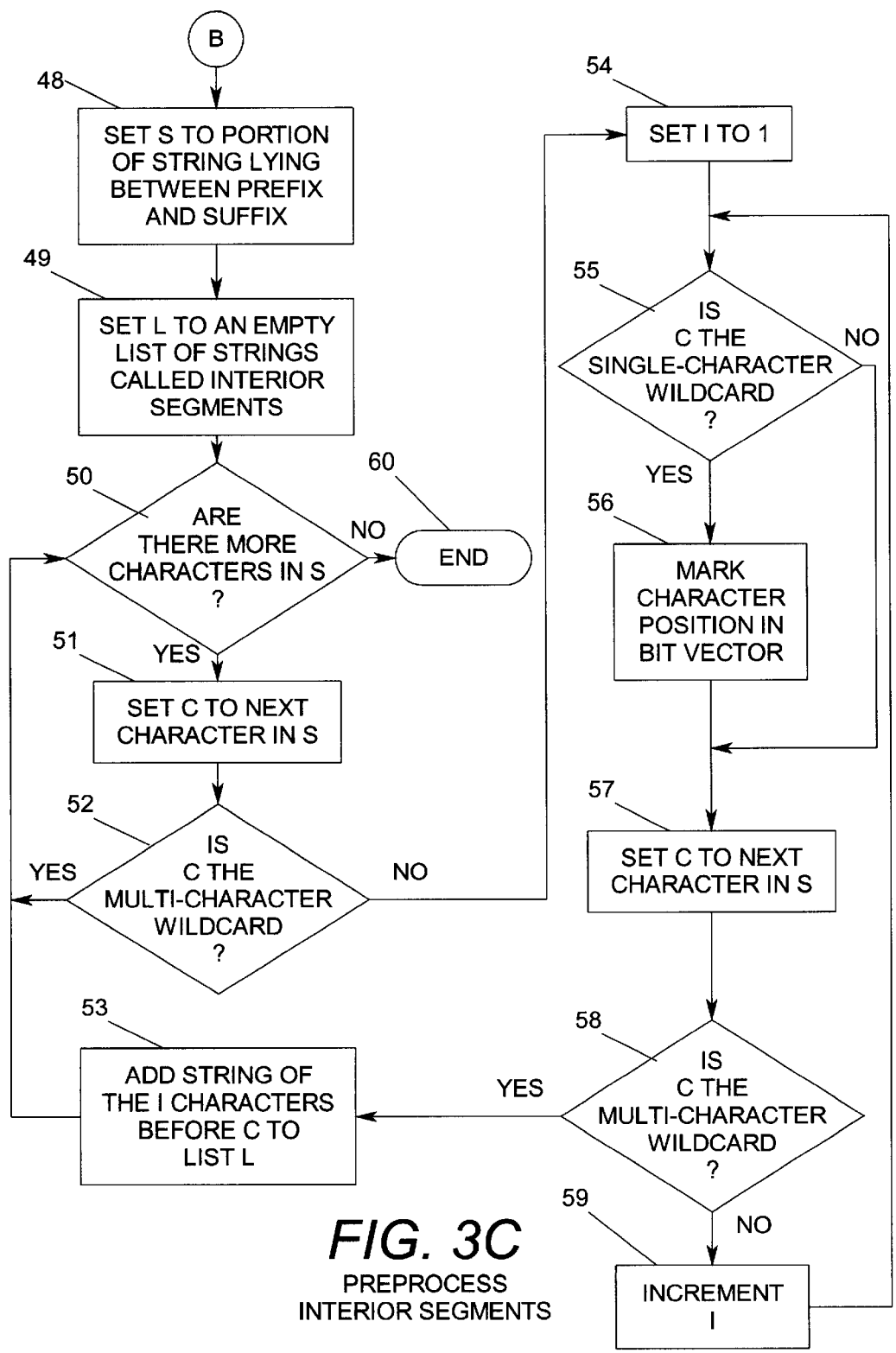

FIG. 3 is a flowchart illustrating the general steps for preprocessing the pattern string. FIG. 3 is comprised of FIGS. 3A, 3B, and 3C.

Referring now to FIG. 3A, a flowchart illustrating the steps for preprocessing the prefix of the pattern string is shown. The process begins with start bubble 30 followed by a process step (block 31) of initializing a prefix variable to an empty string. The process then continues by initializing M, a variable used for iteration, to 1 (block 32). After initializing M, the process step (block 33) gets the character at position M within the pattern string. This is followed by an inquiry as to whether or not the obtained character is a multi-character wild card (diamond 34). If the answer to this inquiry is yes, the process continues as described in FIG. 3B. If the answer to this inquiry is no, the process continues with an inquiry as to whether or not the character is past the end of the string (diamond 35). If the answer to the inquiry posed in diamond 35 is yes, the process continues as described in FIG. 3B. If the answer to the inquiry posed in diamond 35 is no, the process continues with a process step (block 36) of appending the character to the prefix string. Next, an inquiry as to whether or not the character is a single-character wild card is made (diamond 37). If the answer to this inquiry is yes, the process continues by marking the position of the character in a bit vector variable representing positions within the pattern string. If the answer to this inquiry is no, the process does not mark the character position within the bit vector. The process continues with a process step (block 38) of incrementing M, and returning to obtaining the character at position N (block 33). The process continues to loop back to block 33 until the answer to the inquiry posed in diamond 34 or diamond 35 is yes. When the answer to the inquiry posed in diamond 34 or diamond 35 becomes true, the process continues as described in FIG. 3B.

With reference to FIG. 3B, a flowchart illustrating the steps for preprocessing the suffix of the pattern string is shown. The process from FIG. 3A continues by initializing a suffix variable to an empty string (block 40). After initializing the suffix, an integer variable N, used for incrementing purposes, is initialized to 1 (block 41). The process then continues with a process step (block 42) of obtaining the character at the position of the (last multiple wild card character+N). Next, an inquiry is made as to whether or not the character is past the end of the string (diamond 43). If the answer to this inquiry is yes, the process continues as described in FIG. 3C. If the answer to this inquiry is no, the process continues by appending the character to the suffix string (block 44). Next, an inquiry is made as to whether or not the character is the single-character wild card (diamond 45). If the answer to this inquiry is yes, the process marks the character position in the bit vector. Otherwise, the process does not mark the character position in the bit vector. The process then continues with a process step (block 46) of incrementing N. The process then returns to the process step (block 42) of getting the character at the position of (last multiple wild card character+N). The process continues to loop and return to block 42 until the inquiry posed in diamond 43 results in a true answer. Once the answer to the inquiry posed by diamond 43 is yes, the process continues onto FIG. 3C.

Referring now to FIG. 3C, a flowchart illustrating the steps for preprocessing the interior segments of the pattern string is shown. The process described in FIG. 3B continues with a process step (block 48) of setting a string variable S to the portion of the pattern string lying between the prefix and suffix as determined by FIGS. 3A and 3B, respectively. Next, a variable L is set to an empty list of strings (block 49). The empty list will represent the interior segments of the pattern string. The process continues with an inquiry as to whether or not there are more characters in S (diamond 50). If the answer to this inquiry is no, the process exits (bubble 60). On the other hand, if the answer to this inquiry is yes, the process continues by setting a character variable C to the next character in S, starting from the first character in S (block 51). Next, an inquiry is made as to whether or not C is the multi-character wild card (diamond 52). If the answer to this inquiry is yes, the process returns to diamond 50. This removes redundant occurrences of '%'. Otherwise, the process continues with a process step (block 54) of setting a variable I, used to count the number of characters in the current segment, to 1. After initializing I, the process continues with an inquiry as to whether or not C is the single-character wild card. If the answer to this inquiry is yes, the process continues by marking the character position of C in the bit vector (block 56). If the answer to this inquiry is no, the process does not mark the position of character C in the bit vector. The process continues by setting C to the next character in S (block 57). After setting C to the next character, an inquiry is made as to whether or not C is the multi-character wild card (diamond 58). If the answer to this inquiry is yes, the process continues by adding the string consisting of I number of characters before C to the list L (block 53), and returning to diamond 50. If the answer to the inquiry posed in diamond 58 is no, the process continues by incrementing I (block 59), and returning to diamond 55. The process continues until the answer to the inquiry as to whether or not there are more characters in S (diamond 50) is no. The process then exits (bubble 60).

Figure 4A:
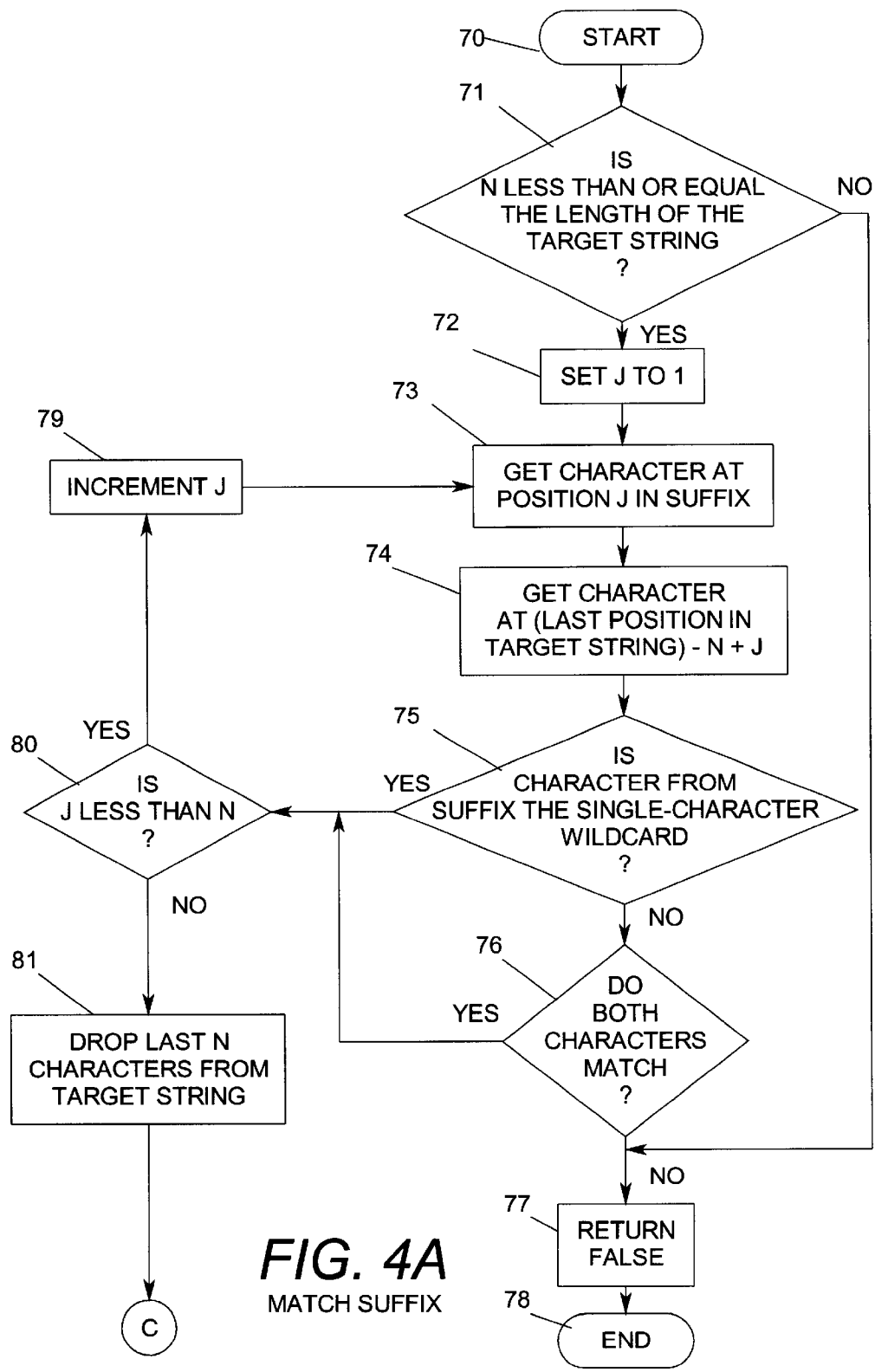
FIGS. 4A, 4B, and 4C combined form a flowchart that illustrates the steps for matching the preprocessed pattern with the target string.
Figure 4B:
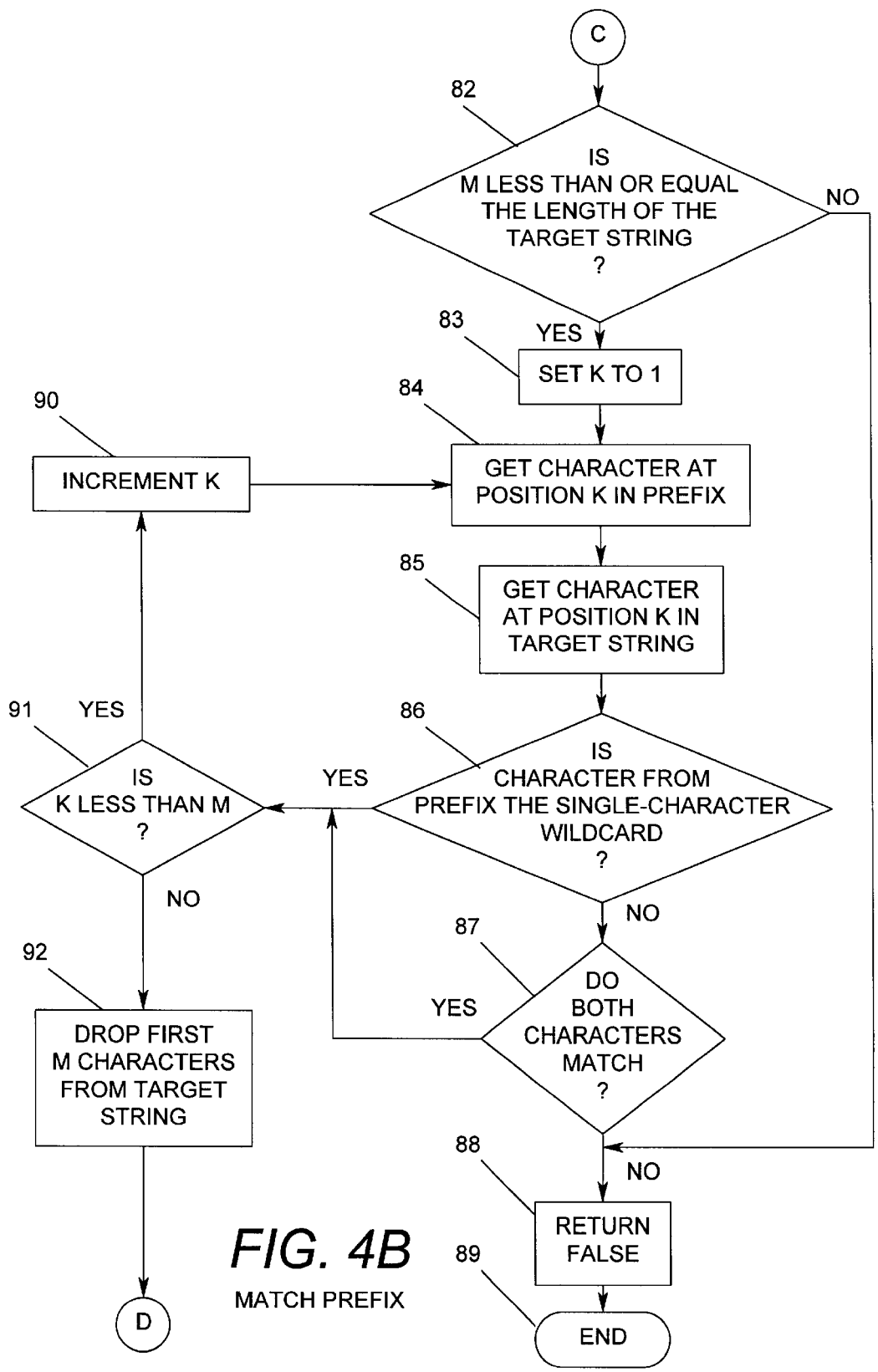
Figure 4C:
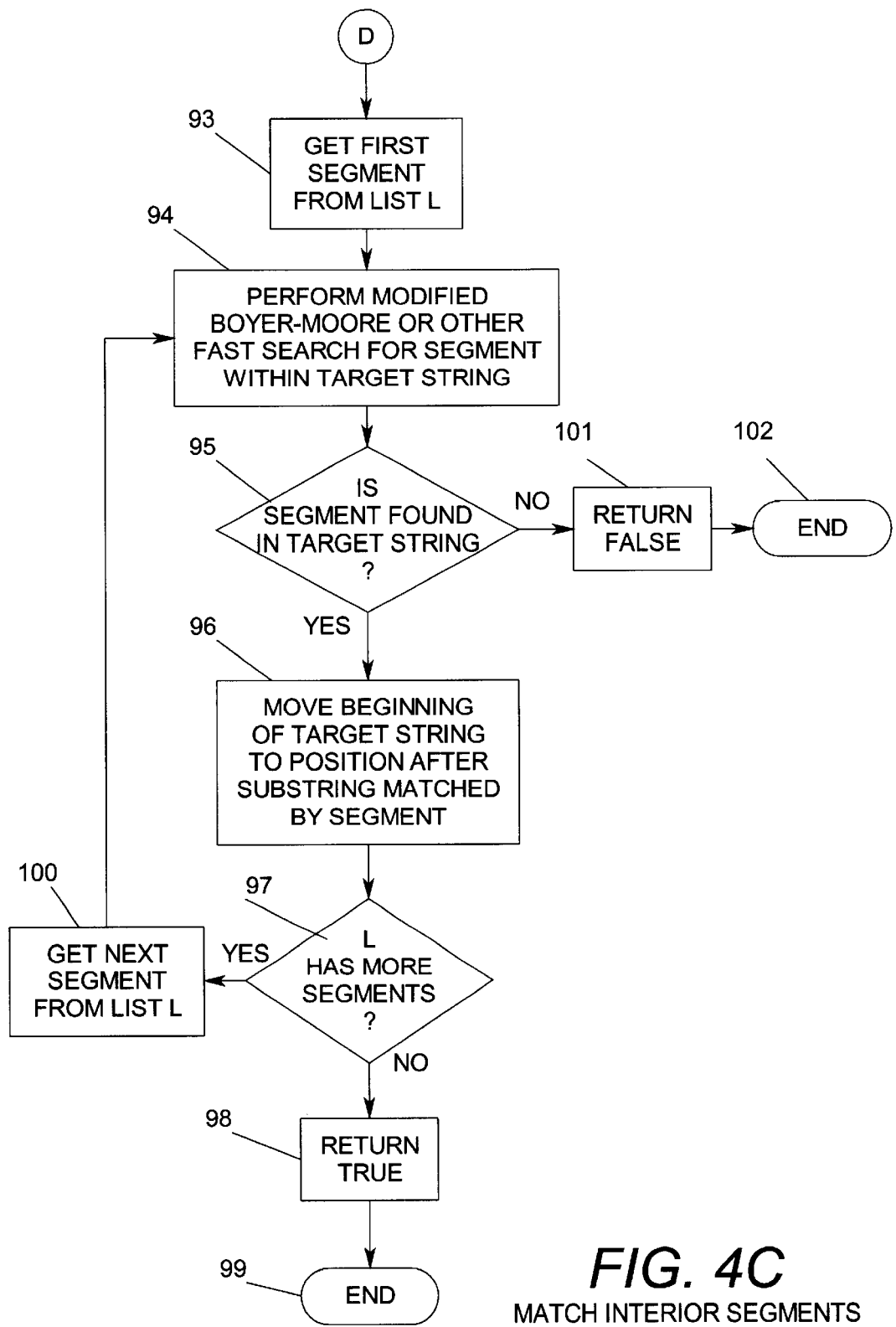

FIG. 4 is a flowchart illustrating the general steps for matching the pattern string with the target string. FIG. 4 is comprised of FIGS. 4A, 4B, and 4C.

Referring now to FIG. 4A, a flowchart illustrating the steps for matching the suffix of the pattern string with the target string is shown. The process begins with start bubble 70 followed by an inquiry as to whether or not N, the length of the suffix of the pattern string, is less than the length of the target string (diamond 71). If the answer to this inquiry is no, the process continues by returning false (block 77) and exiting (block 78). If the answer to this inquiry is yes, the process continues by initializing J, a variable used to iterate through the suffix of the pattern string, to 1 (block 72). After initializing J, the process continues by getting the character at position J in the suffix of the pattern string (block 73). This is followed by a process step (block 74) of getting the character at the (last position of the target string—N+J). The process continues with an inquiry as to whether or not the character from the suffix obtained in block 73 is the single-character wild card (diamond 75). If the answer to this inquiry is no, the process continues with another inquiry as to whether or not the character obtained from the suffix in block 73 matches the character obtained from the target string in block 74 (diamond 76). If the answer to this inquiry is no, the process returns false (block 77) and exits (bubble 78). If the answer to the inquiry posed in diamond 75 is yes, the process continues with an inquiry as to whether or not J is less than N (diamond 80). If the answer to this inquiry is yes, the process increments J (block 79) and returns to the process step (block 73) of obtaining the character at position J in the suffix. If the answer to the inquiry posed in diamond 80 is no, the process drops the last N characters from the target string (block 81) and continues as described in FIG. 4B.

With reference to FIG. 4B, a flowchart illustrating the steps for matching the prefix of the pattern string with the target string is shown. The process described in FIG. 4A continues with an inquiry as to whether or not M, the length of the prefix of the pattern string, is less than or equal to the length of the target string (diamond 82). If the answer to this inquiry is no, the process returns false (block 88) and exits (bubble 89). If the answer to this inquiry is yes, the process continues by initializing K, a variable used for iterating through the prefix of the pattern string, to 1 (block 83). Next, the process gets the character at position K from the prefix of the pattern string (block 84). The process then continues by getting the character at position K in the target string (block 85). After obtaining the characters, the process continues with an inquiry as to whether or not the character from the prefix of the pattern string is the single-character wild card (diamond 86). If the answer to this inquiry is no, the process continues with another inquiry as to whether or not the character from the prefix obtained in block 84 matches the character obtained from the target string in block 85 (diamond 87). If the answer to this inquiry is no, the process returns false (block 88) and exits (bubble 89). If the answer to the inquiry posed in block 87 is yes, or the answer to the inquiry posed in block 86 is yes, the process continues with another inquiry as to whether or not K is less than M (diamond 91). If the answer to this inquiry is yes, the process increments K (block 90) and returns to the process step (block 84) of getting the character at position K from the prefix of the pattern string. If the answer to this inquiry (at step 91) is no, the process drops the first M characters from the target string (block 92) and continues as described in FIG. 4C.

Referring now to FIG. 4C, a flowchart illustrating the steps for matching the interior segments of the pattern string with the target string is shown. The process described in FIG. 4B continues with a process step (block 93) of getting the first interior segment from list L. List L, as mentioned in FIG. 3C, contains the interior segments of the pattern string. The process continues by performing a modified search for the interior segment within the target string (block 94). This search performed is independent of the method of the present invention. The Boyer-Moore search or any other fast string search will suffice for the method of the present invention, as long as it is modified to take single-character wild cards into account. After performing the search, the process continues with an inquiry as to whether or not the interior segment is found within the target string (diamond 95). If the answer to this inquiry is no, the process returns false (block 101) and exits (bubble 102). If the answer to this inquiry is yes, the process moves the beginning of the target string to the position after the substring matched by the interior segment (block 96). Next, an inquiry is made as to whether or not list L has more segments (diamond 97). If the answer to this inquiry is yes, the process continues by obtaining the next interior segment from list L (block 100) and returning to the process step (block 94) of performing a modified search for the interior segment within the target string. If the answer to the inquiry posed in diamond 97 is no, the process returns true (block 98), meaning the pattern string and target string do match. The process then exits (bubble 99).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system including at least one client and using two special character symbols designated as a single-character wild card and a multi-character wild card, a method for matching a pattern string with a target string, said method comprising the steps of:
   (a) preprocessing said pattern string into segments which are the maximal contiguous sequence of characters from the pattern string that do not contain the multi-character wild card;
   (b) matching said target string with said segments of said pattern string;
   (c) utilizing a bit vector providing a bit-position for each character in said pattern string whereby a bit vector signal "1" is set to indicate the presence of a single-character wild card.

2. The method as in claim 1 wherein said segments consist of literal text with no metacharacters and are matched against the target string using string search algorithms.

3. The method as in claim 1 wherein said preprocessing step (a) includes the steps of:
   (a1) extracting a prefix segment from said pattern string;
   (a2) extracting a suffix segment from said pattern string;
   (a3) extracting an interior segment(s) from said pattern string.

4. The method as in claim 3 wherein said matching step (b) of claim 1 includes the steps of:
   (b1) determining that said target string is at least L1 and L2 characters long where L1 is the character-length of said prefix segment and L2 is the character-length of said suffix segment;
   (b2) matching said extracted suffix segment with said target string by comparing said suffix segment to the last L2 characters of said target string;
   (b3) matching said extracted prefix segment with said target string by comparing said prefix segment to the first L1 characters of said target string;
   (b4) matching said extracted interior segment(s) with said target string.

5. The method as in claim 4 wherein said step (b2) of matching said extracted suffix segment includes the steps of:
   (b2a) determining the number of suffix characters comprising said suffix segment;
   (b2b) matching each character of said suffix segment with the final number of said number of suffix characters within said target string, while skipping each single-character wild card marked in said bit vector;
   (b2c) if each of said number of suffix characters match, reducing the end of said target string by said number of suffix characters.

6. The method as in claim 4 wherein said step (b3) of matching said extracted prefix segment includes the steps of:
   (b3a) determining a number of prefix characters comprising said prefix segment;
   (b2b) matching each character of said prefix segment with one of said number of prefix characters at the corresponding position within said target string, while skipping each single-character wild card marked in said bit vector;
   (b3c) if each of said number of prefix characters match, moving the beginning of said target string past said number of prefix characters.

7. The method as in claim 4 wherein said step (b4) of matching said interior segment(s) includes the steps of:
   (b4a) iterating through each of said interior segments within said interior segment list;
   (b4b) performing a search modified to account for single-character wild cards for each of said interior segments within the target string;
   (b4c) repositioning a beginning of said target string for each of said successful searches so that the new position for said beginning is the character following the last character which was matched by a given successful search.

8. The method as in claim 3 wherein said step (a1) of extracting said prefix segment includes the steps of:
   (a1a) initializing said extracted prefix segment to an empty string;
   (a1b) initializing a starting prefix position to a first character in said pattern string;
   (a1c) appending each character, from said starting prefix position up to but not including a first multi-character wild card in said pattern string, to said prefix segment, while placing a position signal for each single-character wild card into said bit vector.

9. The method as in claim 3 wherein said step of (a2) extracting said suffix segment includes the steps of:
   (a2a) initializing said extracted suffix segment to an empty string;
   (a2b) initializing a starting suffix position to a first character past a last multiple wild card character in said pattern string;
   (a2c) appending each character, from said starting suffix position up to a last character in said pattern string, to said suffix segment, while placing a position signal for each single-character wild card into said bit vector.

10. The method as in claim 3 wherein said step (a3) of extracting said interior segment(s) includes the steps of:
    (a3a) initializing an interior segment list to an empty list of strings;
    (a3b) initializing a string to an area of said pattern string lying between said prefix segment and said suffix segment;
    (a3c) adding all characters within said string lying between two multi-character wild cards into an interior segment, while placing a position signal for each single-character wild card into said bit vector;
    (a3d) appending each of said interior segments to said interior segment list in the order of its occurrence within the pattern.

* * * * *